C. S. CORRIGAN.
POWER SHOVEL FOR USE IN MINES TO LOAD COAL AND ORE INTO CARS.
APPLICATION FILED JULY 15, 1920.
1,389,421.
Patented Aug. 30, 1921.
6 SHEETS—SHEET 1.
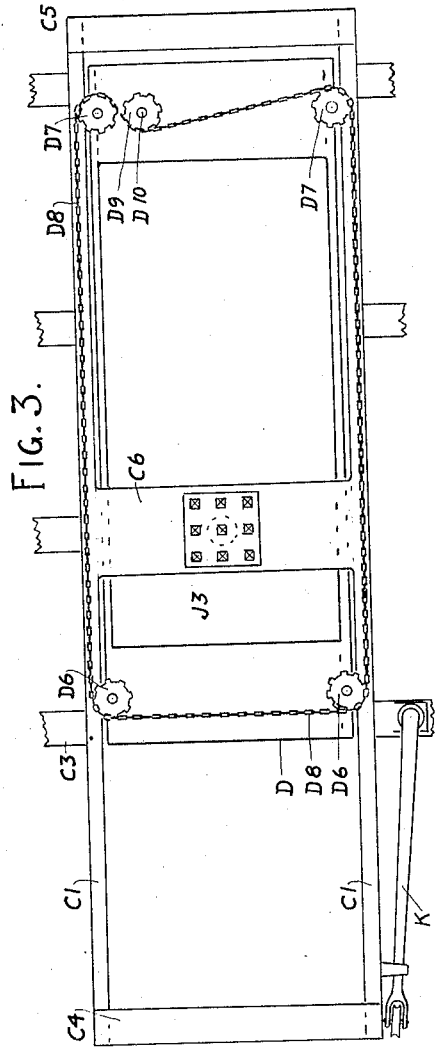
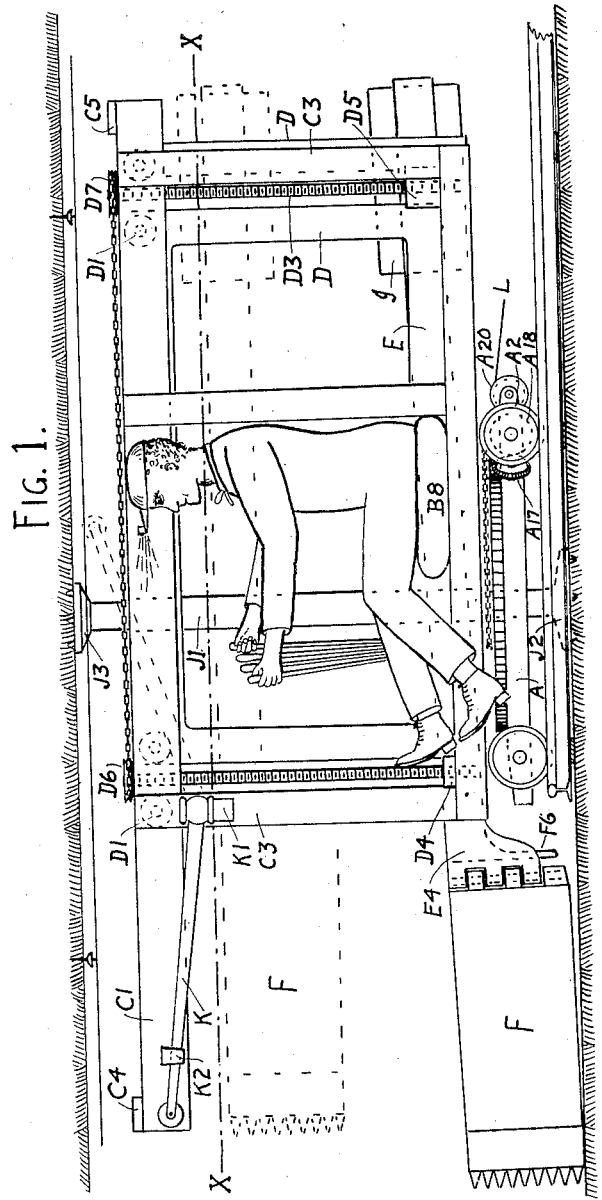
Clyde. S. Corrigan.    INVENTOR.

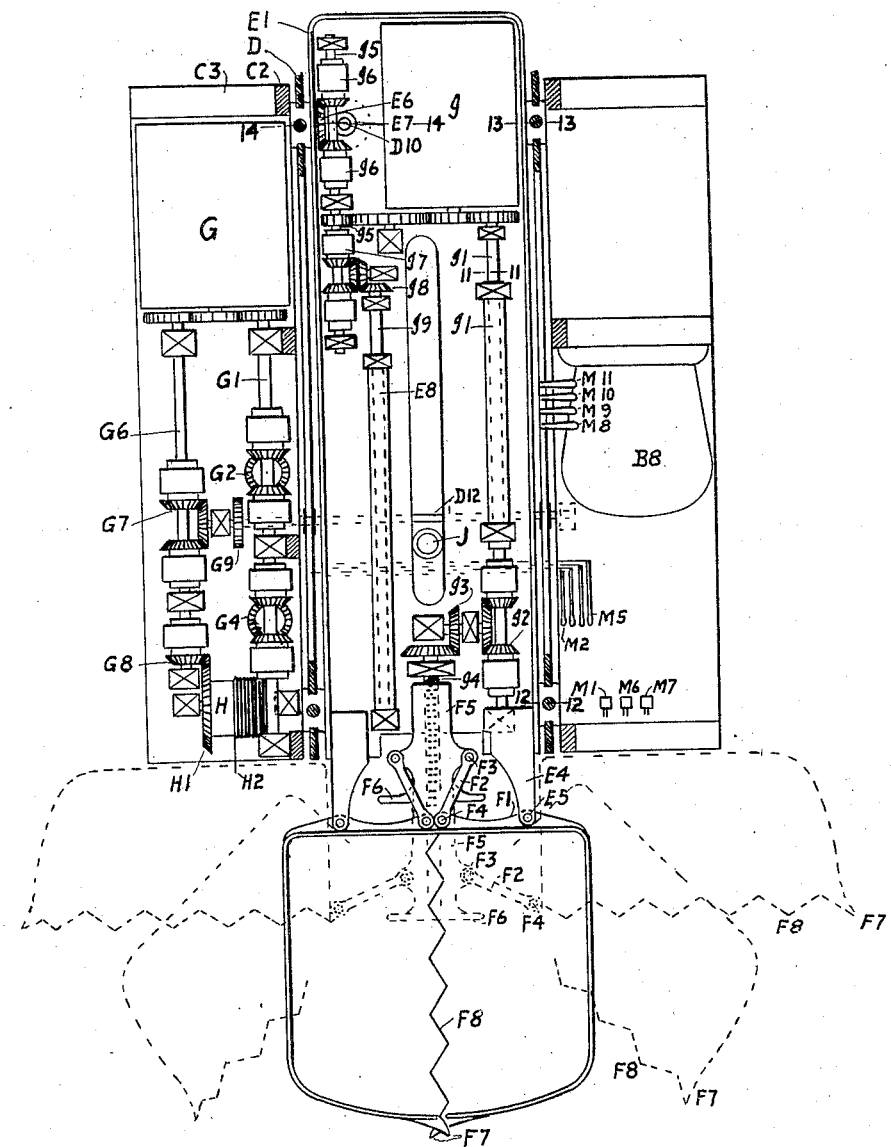

C. S. CORRIGAN.
POWER SHOVEL FOR USE IN MINES TO LOAD COAL AND ORE INTO CARS.
APPLICATION FILED JULY 15, 1920.

1,389,421.

Patented Aug. 30, 1921.
6 SHEETS—SHEET 3.

Inventor
Clyde. S Corrigan

C. S. CORRIGAN.
POWER SHOVEL FOR USE IN MINES TO LOAD COAL AND ORE INTO CARS.
APPLICATION FILED JULY 15, 1920.
1,389,421.
Patented Aug. 30, 1921.
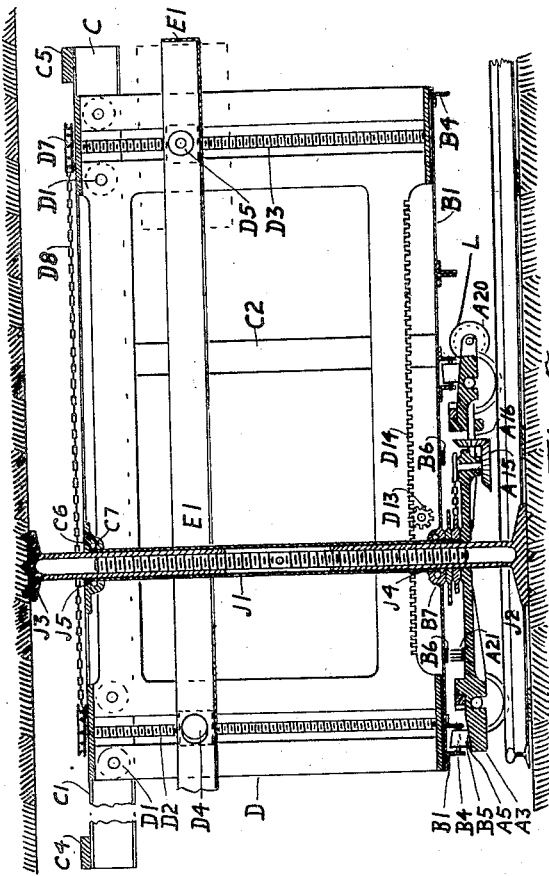
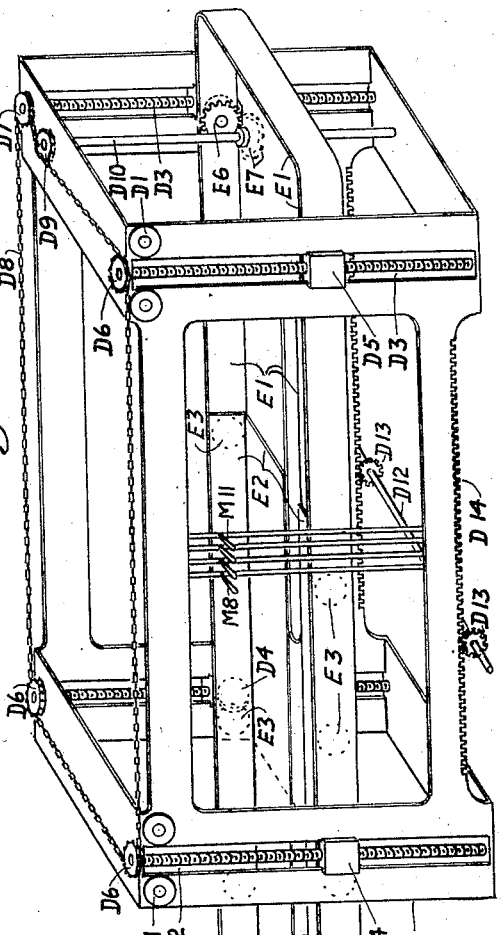
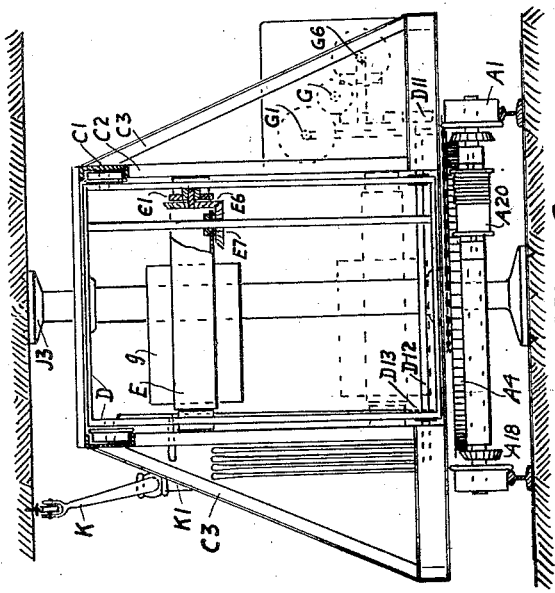
Clyde S. Corrigan, INVENTOR.

C. S. CORRIGAN.
POWER SHOVEL FOR USE IN MINES TO LOAD COAL AND ORE INTO CARS.
APPLICATION FILED JULY 15, 1920.

1,389,421.

Patented Aug. 30, 1921.
6 SHEETS—SHEET 5.

Clyde S. Corrigan  INVENTOR.

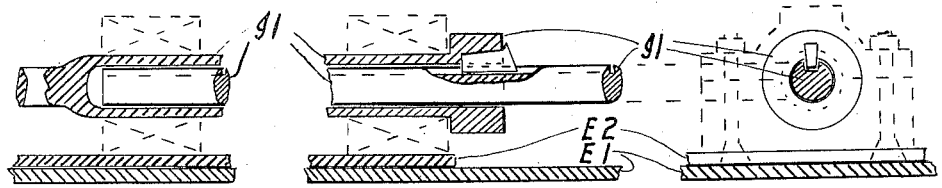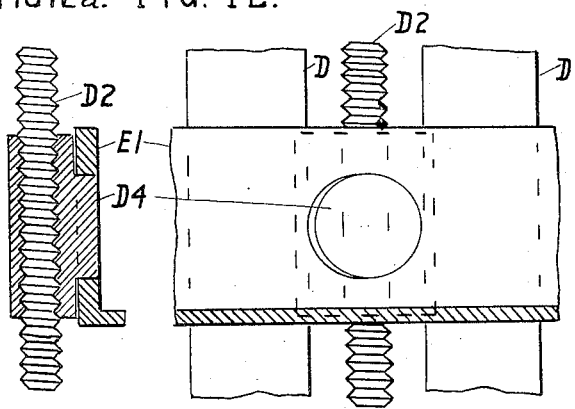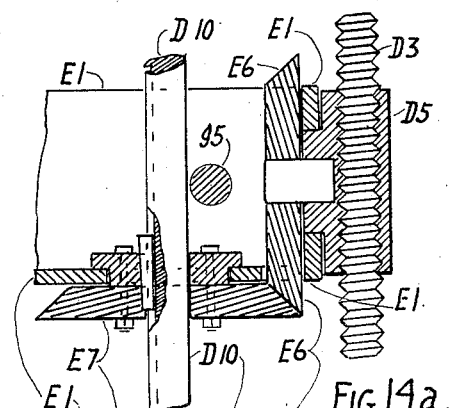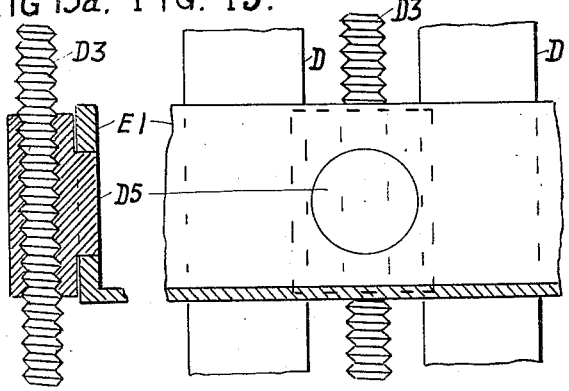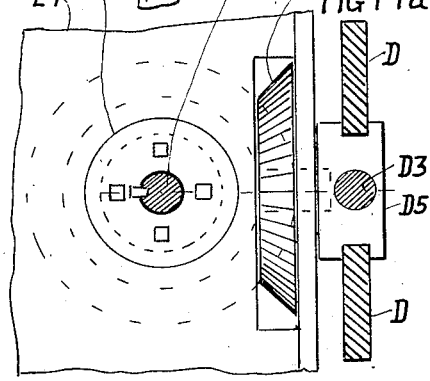

UNITED STATES PATENT OFFICE.

CLYDE S. CORRIGAN, OF NORWOOD, OHIO.

POWER-SHOVEL FOR USE IN MINES TO LOAD COAL AND ORE INTO CARS.

1,389,421.                Specification of Letters Patent.        Patented Aug. 30, 1921.

Application filed July 15, 1920. Serial No. 396,391.

*To all whom it may concern:*

Be it known that I, CLYDE S. CORRIGAN, a citizen of the United States, and a resident of Norwood, in the county of Hamilton and State of Ohio, have invented certain new and useful Improvements in Power-Shovels for Use in Mines to Load Coal and Ore into Cars, of which the following is a full, clear, and exact description, reference being had to the drawings forming part of this specification.

I am aware that various kinds of power shovels are used for loading material in mines, but on account of their large size and height required for operating, they cannot be used for driving entries or in rooms where props are required to support the roof, or in low vein mines.

Therefore, I provide a small circle swing machine that digs horizontally, like a steam shovel does vertically, with flat shovels operating in horizontal planes when either digging or dumping, and requiring no more space above the top of the car than when the same material is loaded by hand. The shovels are dumped into cars by opening and dropping the material, and when necessary a crowd and jerk motion like a man shoveling. The operator may stack material on cars by opening the shovels, then drawing back and closing them, and pushing the material along until the entire car is stacked full.

To provide for the full circle swing of the shovel arm, it must not drop below the turntable platform, therefore, as the shovels must be able to scrape the floor of the mine, they must extend from the top of the shovel arm down to the floor of the mine, so the flatter the shovels are made for the purpose of swinging over the tops of large cars, the smaller the wheels of the carrying truck must be.

The shovels are so shaped and hinged on the arm of the machine that they work on the same principle as grab buckets, but in a horizontal instead of a vertical plane, and instead of opening by gravity, power being necessary for both opening and closing of shovels.

The shovels will dig within a foot of a right angle corner and at any height within the height of the mine as shown in Figs. 4 and 5. The front edges are provided with tusk-teeth for digging or breaking lumps or hard material. The upper tusks can also be used to pull down unsafe roof and furthermore, the bottom edges of shovels may have saw shaped teeth for scraping or smoothing the floor.

The machine will dig and load at any point within the extended distance from its center and between the roof and the floor of a mine by opening the shovels, then crowding them forward, while closing and biting into the material. If the material is hard or lumps too large the repeated crowd and snap of closing the shovels, will enable this machine to dig and pick up any loose material without the help of men with shovels or picks. In soft coal and in robbing pillars that have worked this machine will dig and load all coal without undercutting or blasting.

In some mines a clay or stone parting is found separating seams of coal of different quality if not too hard this shovel will dig out the upper seam of coal, then remove the parting and then the lower seam, loading the different qualities of coal in separate cars.

This machine being small enough to turn around in narrow entries and where mine props are close together, its weight alone will not prevent its tipping or sliding back from the work when digging or dumping. Therefore I provide a vertical jack with spike faced foot and head pieces, pivotally fixed in the center of the machine, so it can be fastened between and at right angles to the roof and floor of the mine, no matter what the variation in height may be and used as a hub or fulcrum against which to exert force to perform work, and on which the machine will turn true, even when working in mines with considerable dip.

On account of the scarcity of labor in mines I have endeavored to make this a one man machine. Therefore, all levers for control of the machine are placed within reach of the operator seated, there not being room for him to stand up on the machine. The reel on the front end will make it possible to switch cars when loading, with the help of only one man. The self propelling mechanism is provided to avoid delay moving from one room to another and to keep the machine close up to the working face.

My invention is more fully illustrated in the accompanying drawings, in which:—

Figure 1 is a side elevation of the machine.

Fig. 2 is a plan view of the parts below $x$—$x$ of Fig. 1.

Fig. 3 is a plan view of the parts above line $x$—$x$ of Fig. 1.

Fig. 6 is a rear end elevation partly in section.

Fig. 7 is a vertical section taken on the center line of the machine.

Fig. 10 is an isometric view of the shovel arm and cage.

Figure 4:
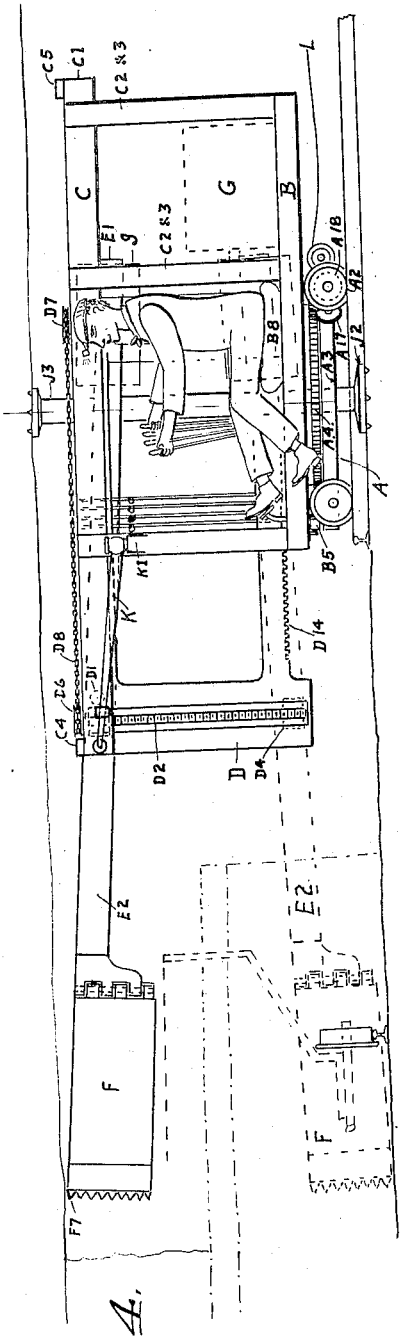
Fig. 4 is a side elevation of the machine with the shovels extended.
Figure 5:
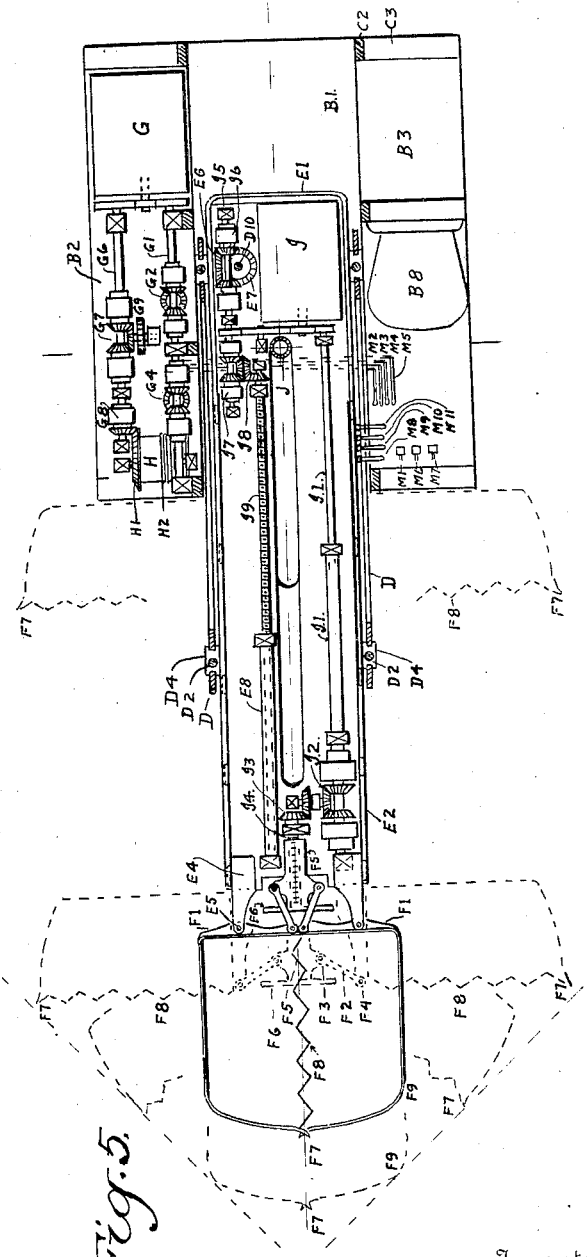
Fig. 5 is a plan view thereof with the shovels extended.
Figure 9:
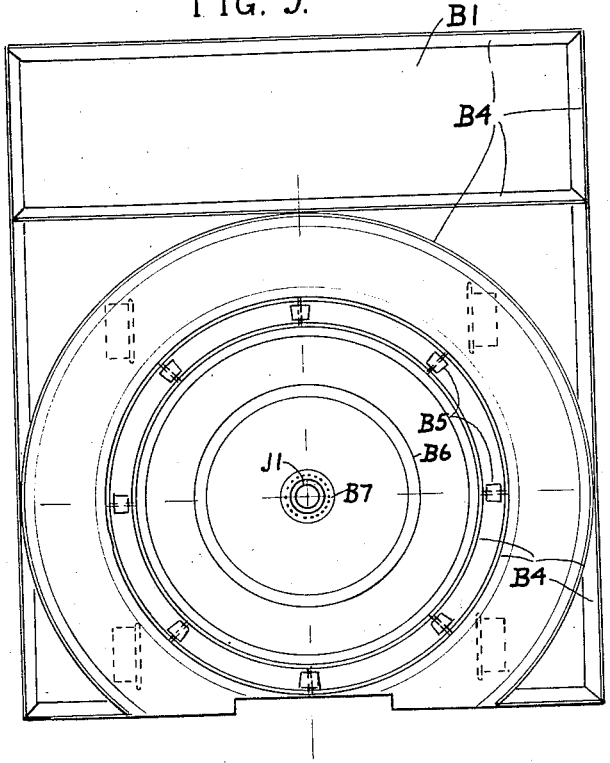
Fig. 9 is a plan view of the bottom of the platform.
Figure 8:
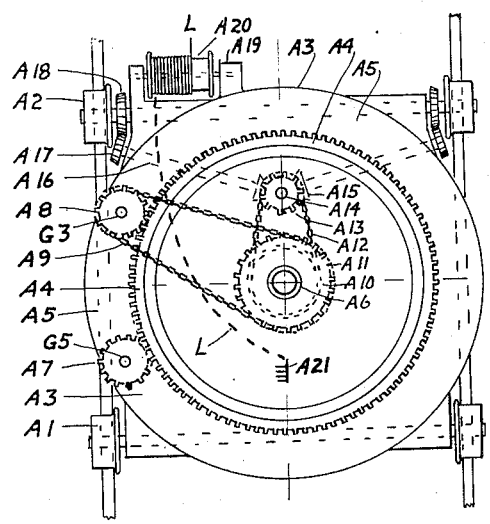
Fig. 8 is a detail plan view of the truck.

Figs. 11 and 11ª are details of the extensible shaft I1, Figs. 12 and 12ª are details of lift nut D4, Figs. 13 and 13ª are details of lift nut D5, Figs. 14 and 14ª are details of sliding gear E7.

Referring to the various drawings in which like letters and numerals refer to like parts, A represents a truck on which is pivotally mounted a platform B, with a raised track C, which supports a cage or frame D, movable longitudinally. Within cage D is a shovel arm E, that may be moved vertically, or longitudinally, the forward end being equipped with shovels F extending below said arm, that are opened or closed in substantially a horizontal plane by flexible cable and sheave means or by stiff link and pin crank means as shown.

To provide for the full circle swing of the shovel arm E, it must not drop below platform B, therefore as the shovels F must be able to scrape the floor of the mine, their height is determined by the height of platform B on truck A, also as the shovels F must be very flat to swing freely over large cars in low vein mines, it is necessary to use small wheel trucks, and confine all the circle swing and locomotion mechanism within the height of the wheels, and keep platform B as low as possible.

The machine may be operated by one or more motors, and electric or other power may be used. I have shown electric motor G, on platform B to provide power for propelling the machine on track or ground. Circle swing motion, longitudinal motion of the cage D, and power for operating reel H may also be obtained from said motor.

On the shovel arm E, I have shown a motor for opening and closing shovels, and controlling both vertical and longitudinal movements of shovel arm in cage D.

J represents the vertical center hub jack, K represents the trolley pole, L the insulated power cable for use when working beyond trolley, and M the levers for controlling movement of the machine.

Referring more in detail to truck A, loose wheels A1, and traction wheels A2, support a base plate A3, with a circular rack A4, and circular runway A5, for roller bearing wheels B5, supporting the platform B.

Base plate A3, has a center collar A6, to the inner part of which is attached the casing J1, of center jack J, said casing forming a hub. The outside part of collar A6, is machined and used as bearing for sprocket wheels A10, and A11, which are attached to each other so that A10, drives A11.

On the rear of base plate A3, are brackets A19, supporting the cable reel A20, on which is wound power cable L, one end of which is attached to contact brush A21.

Platform B is composed of base plate B1, and the laterally extending reinforcing platforms B2, and B3. On the bottom side of B1 are such reinforcing rings and roller bearing supports B4, and roller bearing wheels, B5, as may be necessary. The insulated contact ring B6, for receiving electric power for contact brush A21, is mounted, likewise beneath the platform.

On the upper side of the platform B, are insulated wires leading from the contact ring B6, to the motors G, and I. Central roller bearings B7, are provided for in the platform to fit the bearing ring J4, on the jack casing or hub J1.

The supplementary platform B2 is used as base for the motor G, and its connections, and the like platform B3, is used as a base for an operator's seat B8, and fulcrum for the controlling and brake levers M.

The elevated track C consists of track members C1, of any desired shape supported by posts C2, and braces C3, attached to the base plate B1, and supplementary platforms B2, and B3. The track members C1, are held to gage by top tie plates C4, and C5, and center plate C6. The plate C6, is provided with roller bearings C7, to fit the bearing ring J5, on jack casing or hub J1.

Thus the jack and casing pass through the frame and when the jack is suitably attached to the floor and roof of a mine, forms a hub and fulcrum, on which the machine turns and exerts force to perform work.

The cage D is movably supported in track C, by suitable roller bearing wheels D1. In each side of the cage D are elevating screws D2, and D3, and on these screws are lift nuts D4, and D5, by which the shovel arm E, is supported and raised and lowered. Sprocket wheels D6, and D7, are attached to the elevating screws D2, and D3, above the top plates of cage D for the purpose of operation of the screws. In line with the elevating screws D3 is a vertical shaft D10, carrying a sprocket wheel D9, for operating the sprocket chain D8. The cross section of shaft D10 is such that it may be operated by sliding gear E7, attached to the bottom plate of E1.

The sprocket D6 is smaller than D7, so that when rotated by sprocket chain D8, elevating screws D2 will turn faster than D3, and raise and lower the forward end of shovel arm E, more than the rear end, thereby permitting the use of a motor I of greater height than the sides of the shovel arm.

To move the cage D longitudinally, rack teeth D14 are cut in bottom edges of the lower side pieces of cage D, and gear D11, operates shaft D12, to which are attached pinion gears D13, which mesh with racks D14.

Shovel arm E is in two parts. The outer portion E1 thereof, is movable vertically in cage D and is supported by pins projecting from the lift nuts D4, and D5, the pins at D5 making a snug fit, and the pins at D4 being a snug fit vertically but loose enough horizontally to allow for greater length between D4, and D5, when D4, is higher or lower than D5. Attached to the inside of outer portion E1, is a bevel gear E6, the center of which must coincide with the center of the pins on lift nuts D5 so that it will mesh with the bevel gear E7 journaled to the bottom of E1, when the forward end of the arm is lower or higher than the rear end.

The inner part E2 of the shovel arm is supported and moves longitudinally in the outer part E1, on roller bearing wheels E3, fastened at intervals to the outside of the side bars of the part E2. The shovel hinges E4, and pins E5, are at the forward end of the arm portion E2. The bottom plates of the parts E1, and E2, are both slotted to allow movement past the center jack J.

Shovels F of any shape desired are hinged to shovel arms by hinge parts F1, and pins E5, and attached to and moved by a sleeve nut F5, through the medium links F2, and pins F3, and F4. To the front part of sleeve nut F5, is secured a sovel plate F6, which partly fills the space between shovels when open.

The shovels F are provided with tusk teeth F7, on front edges to dig and break hard material and the upper tusks when necessary may be used to pull down weak roof. Saw teeth F8 are cut on bottom edges of shovels for scraping and smoothing floor, and the corners F9, of the shovels are slightly rounded, so that shovels will dig close up into corners in the mine.

The motor G may be any approved type of mining motor.

A reel H, of any ordinary reel pattern, may be attached to the forward part of platform B2, and operated by bevel gear H1, and provided with a cable H2, for switching cars.

The motor I must be as low and compact as possible on account of limited space and height on the shovel arm.

The jack J may be either hand or power operated, and either screw or ratchet type. It is provided with casing J1, foot piece J2, and head piece J3. Both J2, and J3, preferably have spiked faces for making immovable contact with a mine floor and roof, so that the jack may be used as a fulcrum, against which the machine may exert force to perform work. Hardened roller bearing rings J4, and J5, are shrunk on the casing or hub J1, for the roller bearings B7, and C7, at top and bottom of machine as noted above so that the machine turns true, even when working where there is considerable dip to the mine floor.

The trolley pole K of any suitable form is pivotally mounted on a bracket K1 attached to brace C3 and when not in use is swung around against the rail C1 and held by hook K2.

A power cable L, Fig. 7, is provided with hook to attach to the trolley or other terminal. It is wound on a reel A20. It connects with the brush A21 to transmit power to the contact ring B6 thence to the motors G and I.

All movements of the machine are controlled by levers M within reach of the operator seated, said levers are connected by mechanical means, cranks, rods, pins and splined shafts to the clutches, brakes or the like which they control. Each lever may be operated separately or so connected to others as to move simultaneously with it. The control lever plan I have shown is as follows:

M1 controls the starting and stopping of motor G.

M2 controls the tractive power from motor G through shaft G1 reversing clutches and gears G2, vertical shaft G3, sprocket wheel and sprocket chain drives A8, A9, A10, A11, A12, A13, to the vertical shaft A14, bevel gears A15, shafts A16 and gears A17, driving gears A18 attached to traction wheels A2.

M3 controls the circle swing motion from motor G through shaft G1, reversing clutches and gears G4, vertical shaft G5, and the spur gear A7, which meshes with circle rack A4.

M4 controls the longitudinal motion of cage D from motor G through shaft G6, reversing clutches and gears G7, gear G9, spur gear D11, shaft D12, and pinion gears D13, which mesh in racks D14, thereby moving the cage D forward or back.

M5 controls the reel H from motor G through shaft G6 clutch and gear G8, to bevel gear H1 on reel H.

M6 is connected to friction brake (not shown) for retarding circle swing motion.

M7 is connected to friction brake (not shown) for retarding movement of machine on track.

M8 controls the starting and stopping of motor I.

M9 controls the opening and closing of shovels F, from motor I, through splined shaft I1, reversing clutches and gears I2, bevel gears I3, and screw I4, operating sleeve nut F5, to which the shovels F are attached by pins F3, medium links F2, pins F4, and hinge brackets F1, thereby forcing shovels to swing about the pivot pin E5 in hinges E4.

M10 controls the horizontal reciprocating motion of inner part E2, within outer part E1, of shovel arm E, thus:—Motor I drives shaft I5, reversing clutches and gears I7, bevel gear I8, and screw I9, which engages sleeve nut E8, fastened to the bottom plate E2.

M11 controls the vertical reciprocating movement of shovel arm E within cage D, thus:—Motor I drives shaft I5, reversing clutches and gears I6 and bevel gear E6, the center of which coincides with the center of lift nuts D5 for reasons aforementioned, the gear E6 drives gear E7, journaled to the bottom of E1. Gear E7 is slidingly attached to and drives shaft D10, sprocket wheel D9 on D10 drives sprocket chain D8 which in turn drives sprocket wheels D6, and D7, which are attached to and operate elevating screws D2, and D3, thereby causing lift nuts D4, and D5, to move up and down with shovel arm E.

I am not aware of any mining shovel and digger which operates in a horizontal plane, or about a vertical hub, and with these principles forming the basis of my invention, my machine is constructed so as to have the necessary movements to accomplish both digging, loading and scraping. Not only this but due to this mode of operation the entire device can be made so small as to readily adapt itself to working in low vein mines and in small rooms such as are likely to be encountered in the usual mine.

Having thus described the construction and operation of my invention, I claim—

1. In a power shovel the combination of a frame adapted to turn on a vertical hub, a shovel mechanism adapted to move horizontally and vertically within said frame, a substantially vertical hub centrally positioned and pivotally attached within said frame and shovel mechanism, jack means within said hub adapted to make rigid connection with a mine roof and floor, whereby said hub may be used as a fulcrum against which said shovel mechanism may exert force to perform work.

2. In a power shovel the combination of a truck adapted to receive a vertical hub, a frame adapted to turn on said truck and about said vertical hub, a substantially horizontal shovel arm within said frame, shovels hinged on said arm, means for imparting rotary, horizontal, and vertical motion to said shovel arm, a vertical hub centrally positioned in said truck, frame and shovel arm, jack means in said hub adapted to rigidly engage the roof and floor of a mine, to hold the machine from tipping while exerting force to perform work.

3. A shoveling machine comprising a frame, means for rotatably moving the frame, a horizontal extendible shovel arm within the frame, and means for moving the arm vertically with relation to the frame, said shovel arm comprising in part pivotally hinged shovel blades, and means for horizontally opening and closing them with relation to each other, said shovel blades having cutting edges adapted to penetrate horizontally into mineral material for digging out the same.

4. In a power shovel the combination of a power mechanism, a frame, a shoveling mechanism within the frame, and a substantially vertical hub, centrally positioned and pivotally attached, within the frame, said hub having jack means with foot and head pieces, adapted to make rigid connection with the floor and roof of the chamber in which it works, for the purpose described.

5. A power shovel comprising a suitable truck, a hub vertically and centrally positioned on said truck, jack means for fastening said hub between roof and floor of mine, a power shoveling mechanism rotatably mounted on said truck, and pivotally attached to said hub, to prevent said shoveling mechanism from tipping while performing work.

6. In a power shovel comprising a suitable truck, a vertical hub, a turntable platform with suitable shovel and power mechanism rotatably mounted on said truck and pivotally attached to said hub, a substantially horizontal extendible shovel arm mounted in said mechanism, shovel means pivotally mounted on the front end of the extendible portion thereof, a power means mounted on said shovel arm, a screw member inclosed in a sleeve nut attached to the extendible portion of said arm power means, for imparting longitudinally reciprocating motion thereto, also an extendible shaft and power means for reversibly operating the means for opening and closing and working the said shovel means.

7. In a power shovel the combination of a frame adapted to hold a shovel arm, a substantially horizontal extendible shoved arm therein, and power means for imparting vertical, horizontal and rotary motion thereto, shovel elements hinged to said arm, and means for imparting motion in substantially a horizontal plane, for opening and closing said shovels.

8. In a power shovel the combination of a carrying truck, a turntable platform with an elevated horizontal track mounted thereon, a longitudinally movable cage supported by said track, a substantially horizontal shovel arm movable vertically in said cage, a sliding member of the shovel arm movable longitudinally within the main shovel arm, shovels pivotally hinged to the forward end of said sliding member, power means operating the shovel mechanism and for opening and closing and working said shovels in substantially a horizontal plane.

9. In a power shovel the combination of a carrying truck, a turntable platform with an elevated track, a movable cage mounted therein, and supporting a horizontally extendible and vertically reciprocating shovel arm with shovels hinged thereto, a vertical hub centrally positioned with respect to said truck, platform, elevated track, cage and shovel arm, said hub being pivotally connected to said truck, platform, and elevated track, and slidably positioned within the cage and shovel arm, said hub having jack means with foot and head members by which it may be rigidly fastened between the floor and roof of the chamber in which it is used, to prevent the mechanism from tipping or sliding when power means are operated to cause it to perform work such as digging and swinging to load material into cars.

10. A power shovel comprising a carrying truck, a turntable platform with an elevated track, a longitudinally movable cage mounted thereon and supporting a horizontally extendible shovel arm with shovels hinged thereto, elevating means attached to the aforementioned shovel arm for the purpose of imparting vertically reciprocating motion to said horizontal shovel arm, for the purpose described.

11. In a power shovel comprising a carrying truck, a turntable platform with an elevated horizontal track, a longitudinally movable cage mounted therein, and supporting a horizontally extendible shovel arm with shovels hinged thereto, power means and control levers mounted on said platform to provide locomotion means for said truck, circle swing motion for said turntable platform and mechanism mounted thereon, also longitudinally reciprocating motion of aforementioned cage, vertically reciprocating motion of shovel arm, horizontally reciprocating motion of extendible part of shovel arm and opening and closing motion of shovels in substantially horizontal planes for the purpose described.

12. In a power shovel comprising a suitable truck, a turntable platform with suitable shovel mechanism mounted thereon, a vertically reciprocating extendible horizontal shovel arm, supported in a longitudinally movable cage part of said shovel mechanism, said shovel arm being connected to elevating means vertically positioned in the side frame of said cage, near the front and rear of said cage, means for operating said elevating means so that the forward end of shovel arm may be moved up or down faster than the rear end, causing the forward end of shovel arm to move slightly below a horizontal plane for scraping the floor of mine, and slightly above a horizontal plane for scraping the roof, and also providing space for power means, such as an electric motor, on the rear end of shovel arm, that extends above and below the sides of the shovel arm.

13. In a power shovel comprising a carrying truck, a turntable platform, with an elevated horizontal track, a longitudinally movable cage mounted thereon, and supporting a horizontally extendible shovel arm with shovels hinged thereto, means for lowering the forward end of said shovel arm below the horizontal with relation to the cage, when necessary for shovels to scrape the floor, and means for raising the forward end of shovel arm and shovels above the horizontal, when necessary to scrape the roof with shovels, or to swing said shovels freely above the top of cars and the like for loading.

14. In a power shovel, a low wheeled truck, a low turntable platform, a movable cage mounted thereon, a substantially horizontal extensible and vertically reciprocable shovel arm mounted in said cage, shovels extending below and pivotally hinged to the forward end of said arm, means for opening and closing said shovels in substantially a horizontal plane, said shovels extending such depth below said shovel arm that they will scrape the mine floor when said shovel arm is in its lowest position.

15. A power shovel comprising a frame adapted to rotate, means for rotatably swinging said frame, a substantially horizontal, extensible and vertically reciprocable shovel arm in said frame, shovels hinged to said arm, a reciprocable sleeve nut mounted on the forward end of said arm, links having one end pivotally connected to said shovels and the other end pivotally connected to said sleeve nut, and means for reciprocating said sleeve nut whereby the shovels are opened and closed in a horizontal plane.

16. A shoveling machine comprising a rotatable frame, a suitable truck, means for locomotion secured to said truck, means for revolving the frame on said truck, an extensible shovel arm mounted in substantially a horizontal plane within the frame, and means for extending the arm from the frame, shovels pivotally attached to said arm, means for opening and closing said shovels, jack means for holding the machine in a fixed location while working, said jack having feet to engage the floor and roof of a mine.

CLYDE S. CORRIGAN.